(12) United States Patent
Ke

(10) Patent No.: US 10,292,491 B1
(45) Date of Patent: May 21, 2019

(54) PORTABLE AND FOLDABLE SHELVING

(71) Applicant: Chia Nan Ke, Changhua (TW)

(72) Inventor: Chia Nan Ke, Changhua (TW)

( * ) Notice: Subject to any disclaimer, the term of this patent is extended or adjusted under 35 U.S.C. 154(b) by 0 days.

(21) Appl. No.: 16/109,213

(22) Filed: Aug. 22, 2018

(51) Int. Cl.
*A47B 43/00* (2006.01)
*B62B 5/06* (2006.01)
*B62B 3/02* (2006.01)

(52) U.S. Cl.
CPC ............... *A47B 43/00* (2013.01); *B62B 3/02* (2013.01); *B62B 5/06* (2013.01)

(58) Field of Classification Search
CPC .............. A47B 43/00; B62B 5/06; B62B 3/02
USPC ....... 108/166, 167, 170, 171, 173, 175, 179, 108/115; 211/149, 195, 132.1, 189
See application file for complete search history.

(56) References Cited

U.S. PATENT DOCUMENTS

| | | | | |
|---|---|---|---|---|
| 1,167,550 A * | 1/1916 | Forsyth | ...................... | A47F 5/13 108/163 |
| 1,198,431 A * | 9/1916 | Forsyth | ...................... | A47F 5/13 108/163 |
| 1,209,150 A * | 12/1916 | Hannold | ................... | A47B 3/04 108/167 |
| 2,938,632 A * | 5/1960 | Mondineu | ............... | A47B 31/04 108/106 |
| 3,093,247 A * | 6/1963 | Erickson | ................. | A47B 31/04 108/188 |
| 3,097,748 A * | 7/1963 | Drabert | ..................... | B62B 3/02 108/171 |
| 3,101,062 A * | 8/1963 | Kanzelberger | ............ | A47B 3/14 108/173 |
| 3,101,064 A * | 8/1963 | Kanzelberger | ......... | A47B 3/087 108/168 |
| 3,138,122 A * | 6/1964 | Mondineu | ............... | A47B 31/04 108/106 |
| 3,191,991 A * | 6/1965 | Anderson | ................ | A47B 3/14 108/115 |
| 3,212,463 A * | 10/1965 | Anderson | .............. | A47B 3/087 108/168 |
| 3,245,363 A * | 4/1966 | Kanitz | .................... | A47B 3/087 108/168 |
| 4,249,773 A * | 2/1981 | Giambalvo | .............. | A47B 3/14 108/173 |
| 4,724,882 A * | 2/1988 | Wang | ................... | E04F 10/0614 135/117 |
| 4,740,010 A * | 4/1988 | Moskovitz | ............. | A47B 31/04 108/170 |

(Continued)

*Primary Examiner* — Jonathan Liu
*Assistant Examiner* — Devin K Barnett
(74) *Attorney, Agent, or Firm* — Che-Yang Chen; Law Offices of Scott Warmuth

(57) ABSTRACT

A portable and foldable shelving may comprise two connecting units and a shelving. Each of the two connecting units has a connecting tube and an adjusting base, and the adjusting base is slidably sleeved on the connecting tube. The shelving comprises a first shelf body having at least a first upper board and a first lower board and a second shelf body comprising at least a second upper board and a second lower board. inner edges of the first shelf body and the second shelf body are coupled together, and the upper boards and the lower boards of the first shelf body and the second shelf body are pivotally connected to the connecting tubes through a plurality of wing pieces, which enables the upper boards same as the lower boards to be folded toward each other or to be unfolded away from each other.

4 Claims, 13 Drawing Sheets

(56) References Cited

U.S. PATENT DOCUMENTS

| | | | | |
|---|---|---|---|---|
| 4,949,649 A * | 8/1990 | Terres | ............... | E04H 3/28 108/116 |
| 5,131,547 A * | 7/1992 | Goldberg | ............... | A47F 5/13 108/166 |
| 6,082,051 A * | 7/2000 | Burton | ............... | E04H 3/28 108/169 |
| 6,123,207 A * | 9/2000 | Mast | ............... | A47B 43/00 211/149 |
| 6,223,661 B1 * | 5/2001 | Griepentrog | ............... | A47B 3/14 108/115 |
| 6,705,234 B1 * | 3/2004 | Miller | ............... | A47B 3/087 108/115 |
| 6,830,294 B2 * | 12/2004 | Berthiaume | ............... | A47C 1/12 108/168 |
| 6,848,371 B2 * | 2/2005 | Zheng | ............... | A47B 43/02 108/165 |
| 7,171,911 B1 * | 2/2007 | Rivera, Jr. | ............... | A47B 3/14 108/115 |
| 7,278,361 B2 * | 10/2007 | Zhurong | ............... | A47B 3/087 108/132 |
| 8,256,630 B2 * | 9/2012 | Zhu | ............... | A47B 31/04 211/149 |
| 8,672,147 B2 * | 3/2014 | Lam | ............... | A47G 25/0685 211/149 |
| 9,474,368 B2 * | 10/2016 | Frankel | ............... | A47B 43/00 |
| 9,913,533 B1 * | 3/2018 | Ke | ............... | A47B 43/00 |
| 2004/0226491 A1 * | 11/2004 | Chen | ............... | A47B 3/002 108/124 |
| 2004/0238469 A1 * | 12/2004 | Ng | ............... | A47B 43/00 211/149 |
| 2006/0226101 A1 * | 10/2006 | Liang | ............... | A47B 43/00 211/149 |
| 2007/0251907 A1 * | 11/2007 | Li | ............... | A47B 3/087 211/195 |
| 2010/0326938 A1 * | 12/2010 | Zhu | ............... | A47B 31/04 211/149 |
| 2011/0155680 A1 * | 6/2011 | Pong | ............... | A47B 43/00 211/199 |
| 2011/0253660 A1 * | 10/2011 | Pong | ............... | A47B 31/04 211/198 |
| 2014/0353271 A1 * | 12/2014 | Kruse | ............... | A47F 5/01 211/188 |
| 2016/0066687 A1 * | 3/2016 | Frankel | ............... | A47B 43/00 211/149 |

* cited by examiner

PORTABLE AND FOLDABLE SHELVING

FIELD OF THE INVENTION

The present invention relates to a shelving and more particularly to a portable and foldable shelving.

BACKGROUND OF THE INVENTION

The conventional shelving in the market is variety, but most of them have a fixed structure which makes the shelving to firmly stand on the floor. Generally, components of a shelving are disassembled and packaged for easy to shipping. However, a user has to cost time and effort to assembly the shelving after purchasing, and when the shelving cannot be folded or moved, it is space-consuming when not in use.

Therefore, the foldable shelving was invented, currently is widely accepted by users. Referring to FIG. 14, in order to achieve folding effect, a conventional shelving (30) comprises an outer tube (31) which is configured to be inserted into an inner tube (32) thereof, and the outer tube (31) further has a locking piece (311) and a pulling member (312) while the inner tube (31) comprises an engaging portion at an upper portion thereof. An upper end of the inner tube (31) is connected to a foldable shelf board (33). When the inner tube (32) slides into the outer tube (31) to enable the shelf board (33) to be positioned horizontally, the locking piece (311) driven by the pulling member (312) is adapted to engage with the engaging portion (321), thereby supporting the shelving (30). On the other hand, when the shelving (30) needs to be folded, a user can disengage the locking piece (311) from the engaging portion (321) and pull the inner tube (32) upwardly along the outer tube (31), and the shelf board (33) is adapted to be driven and folded, thereby enabling the shelving (30) into a folded position. However, the conventional foldable shelving still has its shortcomings and limitations in folding and moving process. Therefore, there remains a need for a new and improved design for a portable and foldable shelving to overcome the problems presented above.

SUMMARY OF THE INVENTION

The present invention provides a portable and foldable shelving which comprises two connecting units and a shelving. Each of the two connecting units has a connecting tube and an adjusting base, and the adjusting base is slidably sleeved on the connecting tube. Moreover, an opening formed at an outer side of the adjusting base is pivotally connected to a tightening member through a shaft bolt, and the tightening member is configured to rotate about the shaft bolt. A first pivot and a first abutting portion formed on an inner wall of the tightening member are adapted to secure the connecting tube. Two connecting pieces are respectively formed at two lateral sides of the adjusting base symmetrically, and each of the connecting pieces is pivotally connected to a connecting rod. The shelving comprises a first shelf body and a second shelf body, and the first shelf body has at least a first upper board and a first lower board while the second shelf body comprises at least a second upper board and a second lower board. Each of two lateral sides of the first shelf body has a vertical first supporting post which is connected to the first upper board and the first lower board at different heights, and each of two lateral sides of the second shelf body comprises a vertical second supporting post which is connected to the second upper board and the second lower board at different heights. Moreover, inner edges of the first shelf body and the second shelf body are coupled together, and each of the two lateral sides of the first shelf body and the second shelf body has two wing pieces mounted at the connection between the first upper board and the second upper board and the connection between the first lower board and the second lower board. Furthermore, each two wing pieces at the same height are positioned symmetrically at the two lateral sides of the shelving. Additionally, each of the wing pieces comprises a second pivot and two parallel second abutting portions, and each of the connecting tubes is pivotally connected to the first shelf body and the second shelf body through the second pivot. Moreover, each of the wing pieces has two through holes respectively penetrating through two side portions thereof, and the two connecting rods of the adjusting base are configured to connect to the two through holes respectively.

In one embodiment, each of the connecting tubes has an inverted L-shaped upper blocking member formed at an upper end thereof.

In another embodiment, each of the first supporting posts and the second supporting posts is connected to a wheel at a lower portion thereof to enable the shelving to be portable.

In still another embodiment, a handle is integrally formed between the two first supporting posts.

In a further embodiment, a plurality of arc-shaped first locating pieces are formed at inner edges of the first upper board and the first lower board while a plurality of arc-shaped second locating pieces are formed at inner edges of the second upper board and the second lower board; when the first shelf body is coupled with the second shelf body, the first locating pieces on the first upper board and the second locating pieces on the second upper board are configured to be located alternatively, and also the first locating pieces on the first lower board and the second locating pieces on the second lower board are adapted to be located alternatively; two shafts are adapted to laterally penetrate through the first locating pieces and the second locating pieces to secure between the first upper board and the second upper board and to laterally penetrate through the first locating pieces and the second locating pieces to secure between the first lower board and the second lower board respectively such that the first upper board and the second upper board are adapted to be folded about the shaft toward each other while the first lower board and the second lower board are configured to be folded about another shaft toward each other.

Comparing with conventional foldable shelving, the present invention is advantageous because: (i) the two connecting units are respectively coupled at the two lateral sides of the shelving between the first shelf body and the second shelf body, and the upper boards and the lower boards are pivotally connected to the connecting tubes through the wing pieces, which enables the upper boards same as the lower boards to be folded toward each other or to be unfolded away from each other; (ii) each of the adjusting bases is adapted to be moved along the connecting tube, and the tightening member is configured to secure the position of the adjusting base on the connecting tube; and (iii) when the shelving is at unfolded position, the two second abutting portions of the wing piece are adapted to couple with the two lateral sides of the connecting tube, thereby enhancing the structural strength of the shelving.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
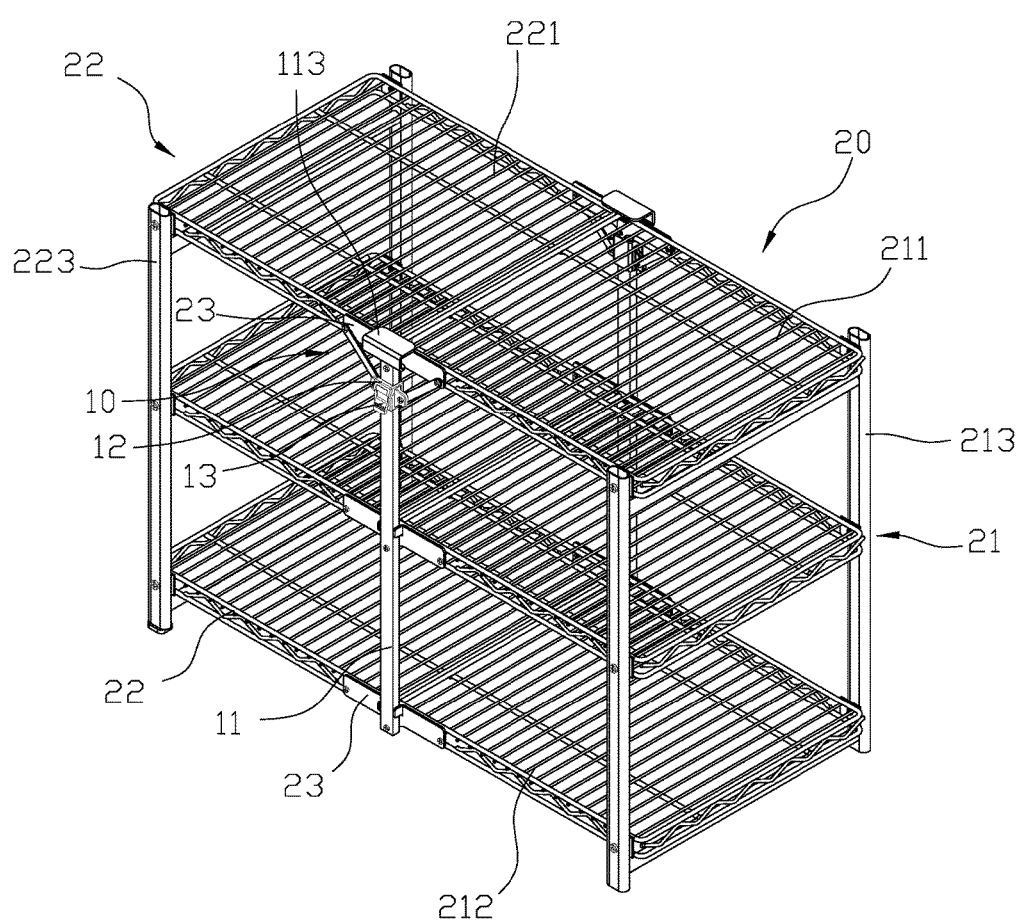
FIG. 1 is a three-dimensional assembly view of a portable and foldable shelving of the present invention.
Figure 2:
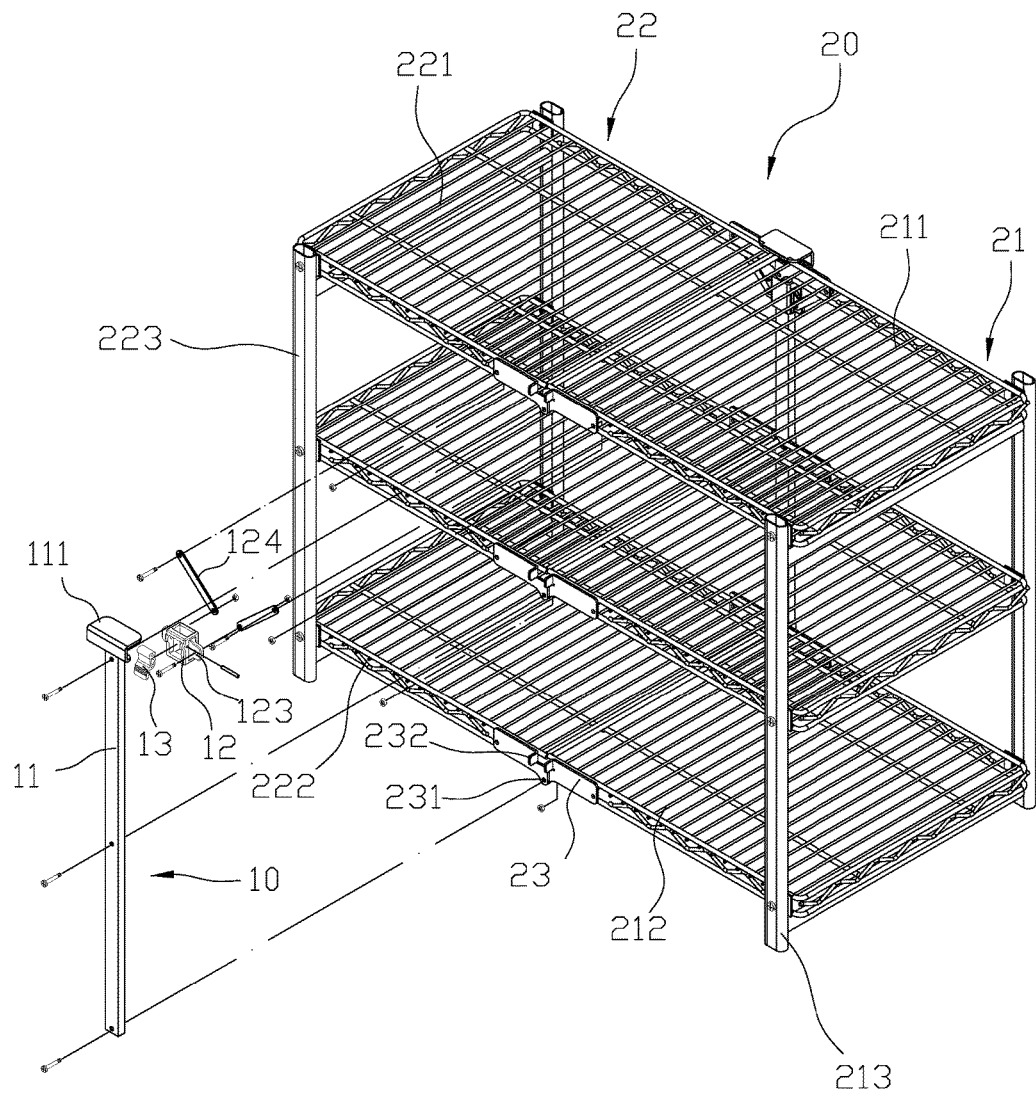
FIG. 2 is an exploded view of the portable and foldable shelving of the present invention.
Figure 3:
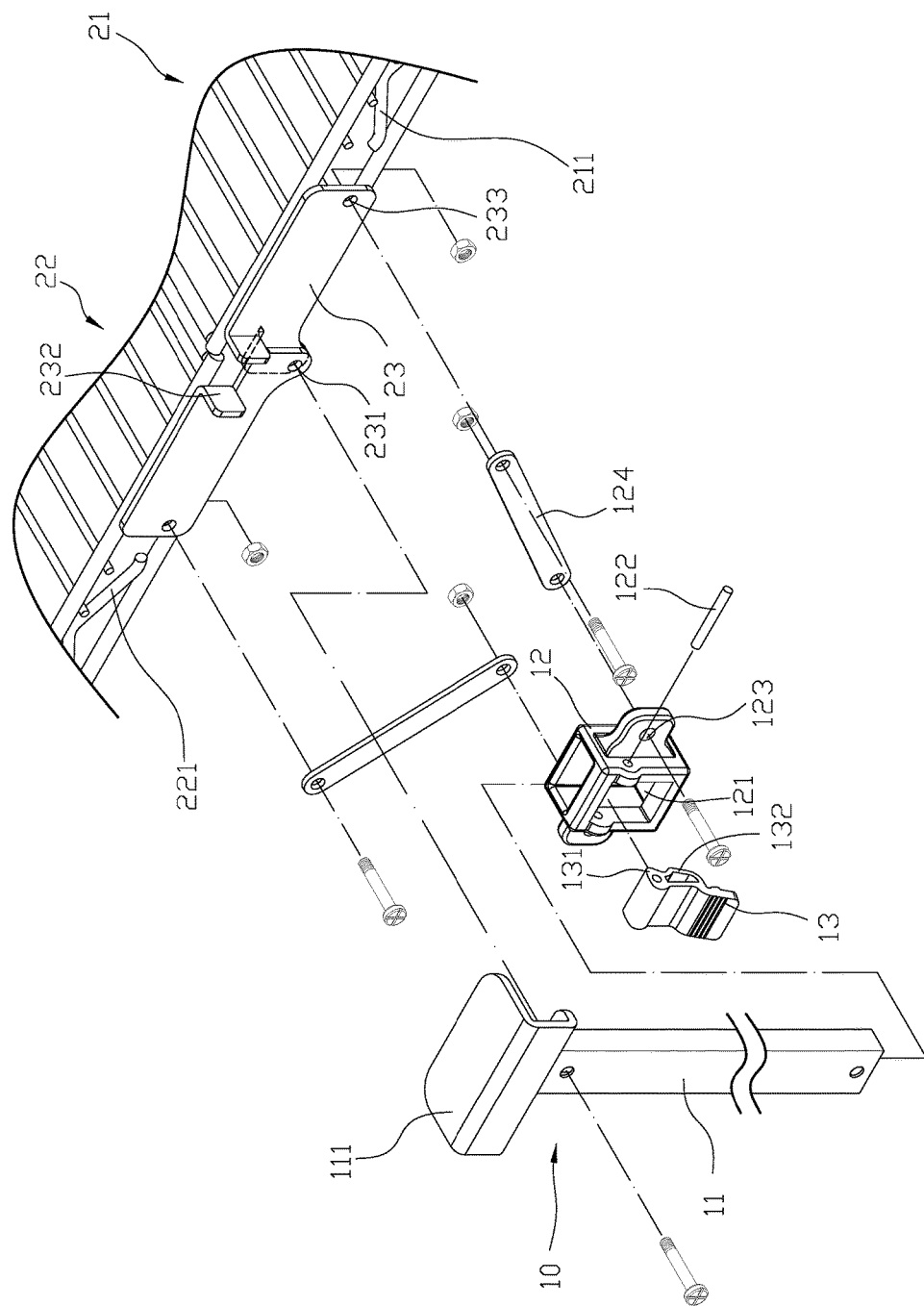
FIG. 3 is a partial exploded view of a connecting unit of the portable and foldable shelving of the present invention.
Figure 4:
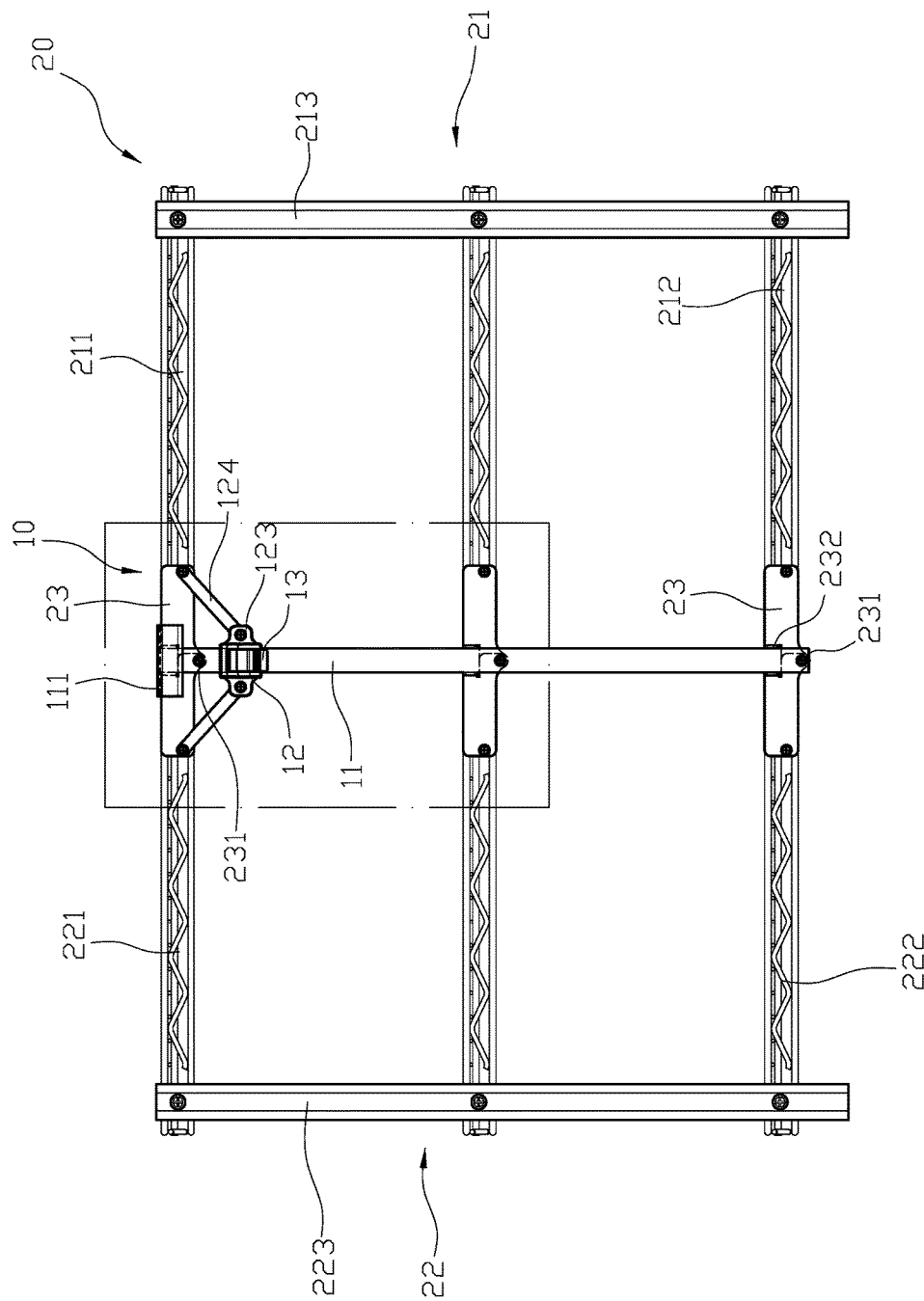
FIG. 4 is a front view of the portable and foldable shelving of the present invention.
Figure 5:
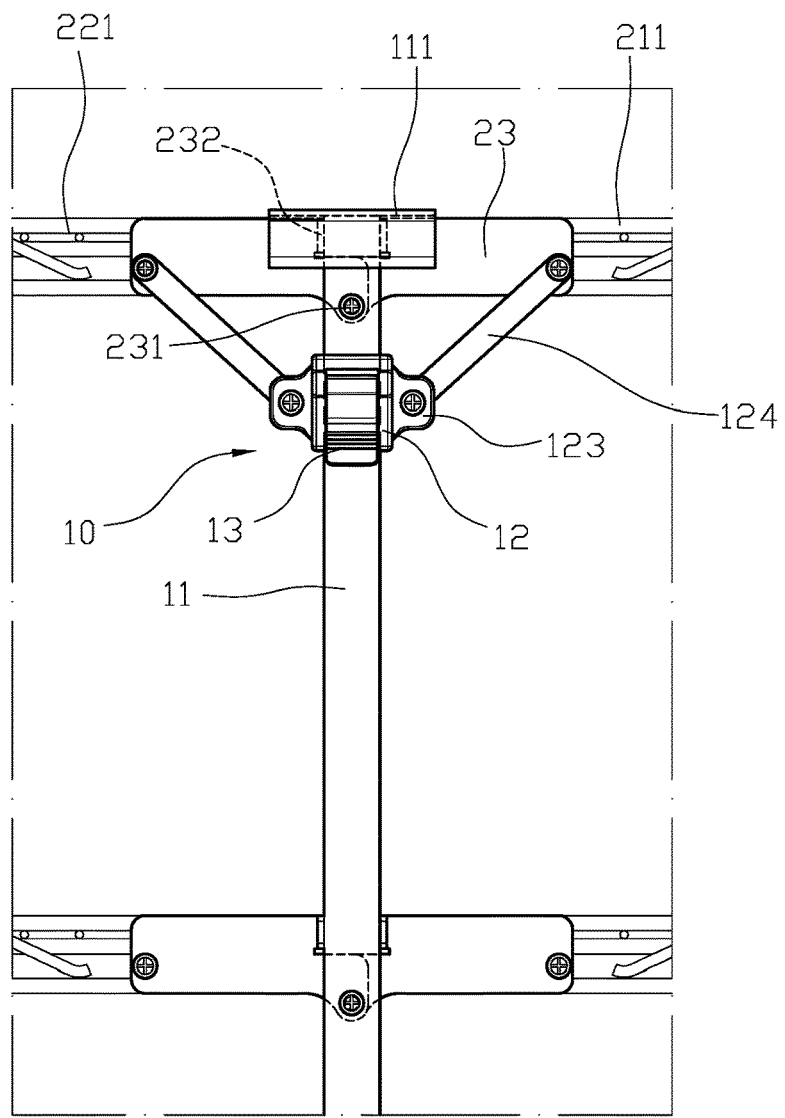
FIG. 5 is a partial enlarged view of FIG. 4.

In order to further understand the goal, characteristics and effect of the present invention, a number of embodiments along with the drawings are illustrated as following:

Referring to FIGS. 1 to 3, the present invention provides a portable and foldable shelving which comprises two connecting units (10) and a shelving (20). Each of the two connecting units (10) has a connecting tube (11) and an adjusting base (12), and an inverted L-shaped upper blocking member (111) is formed at an upper end of the connecting tube (11) while the adjusting base (12) is slidably sleeved on the connecting tube (11). Moreover, an opening (121) formed at an outer side of the adjusting base (12) is pivotally connected to a tightening member (13) through a shaft bolt (122), and the tightening member (13) is configured to rotate about the shaft bolt (122). A first pivot (131) and a first abutting portion (132) formed on an inner wall of the tightening member (13) are adapted to secure the connecting tube (11). Two connecting pieces (123) are respectively formed at two lateral sides of the adjusting base (12) symmetrically, and each of the connecting pieces (123) is pivotally connected to a connecting rod (124). The shelving (20) comprises a first shelf body (21) and a second shelf body (22), and the first shelf body (21) has at least a first upper board (211) and a first lower board (212) while the second shelf body (22) comprises at least a second upper board (221) and a second lower board (222). Additionally, according to the configuration of the shelving (20), the number of additional boards are configured to be added between the first upper board (211) and the first lower board (212) and between the second upper board (221) and the second lower board (222). Each of two lateral sides of the first shelf body (21) has a vertical first supporting post (213) which is connected to the first upper board (211) and the first lower board (212) at different heights, and each of two lateral sides of the second shelf body (22) comprises a vertical second supporting post (223) which is connected to the second upper board (221) and the second lower board (222) at different heights. Moreover, inner edges of the first shelf body (21) and the second shelf body (22) are coupled together, and each of the two lateral sides of the first shelf body (21) and the second shelf body has two wing pieces (23) mounted at the connection between the first upper board (211) and the second upper board (221) and the connection between the first lower board (212) and the second lower board (222). Furthermore, each two wing pieces (23) at the same height are positioned symmetrically at the two lateral sides of the shelving (20). Additionally, each of the wing pieces (23) comprises a second pivot (231) and two parallel second abutting portions (232), and each of the connecting tubes (11) is pivotally connected to the first shelf body (21) and the second shelf body (22) through the second pivot (231). Moreover, each of the wing pieces (23) has two through holes (233) respectively penetrating through two side portions thereof, and the two connecting rods (124) of the adjusting base (12) are configured to connect to the two through holes (233) respectively.

Referring to FIGS. 1 to 5, each of the adjusting bases (12) is sleeved on the connecting tube (11) of the connecting unit (10), and the adjusting base (12) is adapted to have vertical moves along the connecting tube (11). The two connecting units (10) are respectively connected to the shelving (20) at the two lateral sides thereof between the first shelf body (21) and the second shelf body (22). The first upper board (211) and the second upper board (221) are connected through the two wing pieces (23) at two lateral sides thereof, and each of the second pivots (231) of the wing pieces (23) is pivotally connected at an upper portion of the connecting tube (11). Furthermore, the two second abutting portions (232) of the wing piece (23) are coupled at two lateral sides of the upper portion of the connecting tube (11), and the two connecting rods (124) of the adjusting base (12) are respectively connected to the two through holes (233) of the wing piece (23). On the other hand, similarly, the first lower board (212) and the second lower board (222) are connected through the two wing pieces (23) at two lateral sides thereof, and each of the second pivots (231) of the wing pieces (23) is pivotally connected at a lower portion of the connecting tube (11). Also, the two second abutting portions (232) of the wing piece (23) are coupled at two lateral sides of the lower portion of the connecting tube (11). As a result, the first upper board (211) and the second upper board (221) or the first lower board (212) and the second lower board (222) are configured to take the two second pivots (231) of the two wing pieces (23) as pivots to be downwardly folded toward each other. Also, when the first upper board (211) and the second upper board (221), and the first lower board (212) and the second lower board (222) are upwardly and fully unfolded, the two parallel second abutting portions (232) on each of the wing pieces (23) are configured to abut against the two lateral sides of the connecting tube (11) respectively so as to enable the first upper board (211) and the second upper board (221), and the first lower board (212) and the second lower board (222) to be positioned horizontally and to be perpendicular to the two connecting tubes (11).

Figure 6:
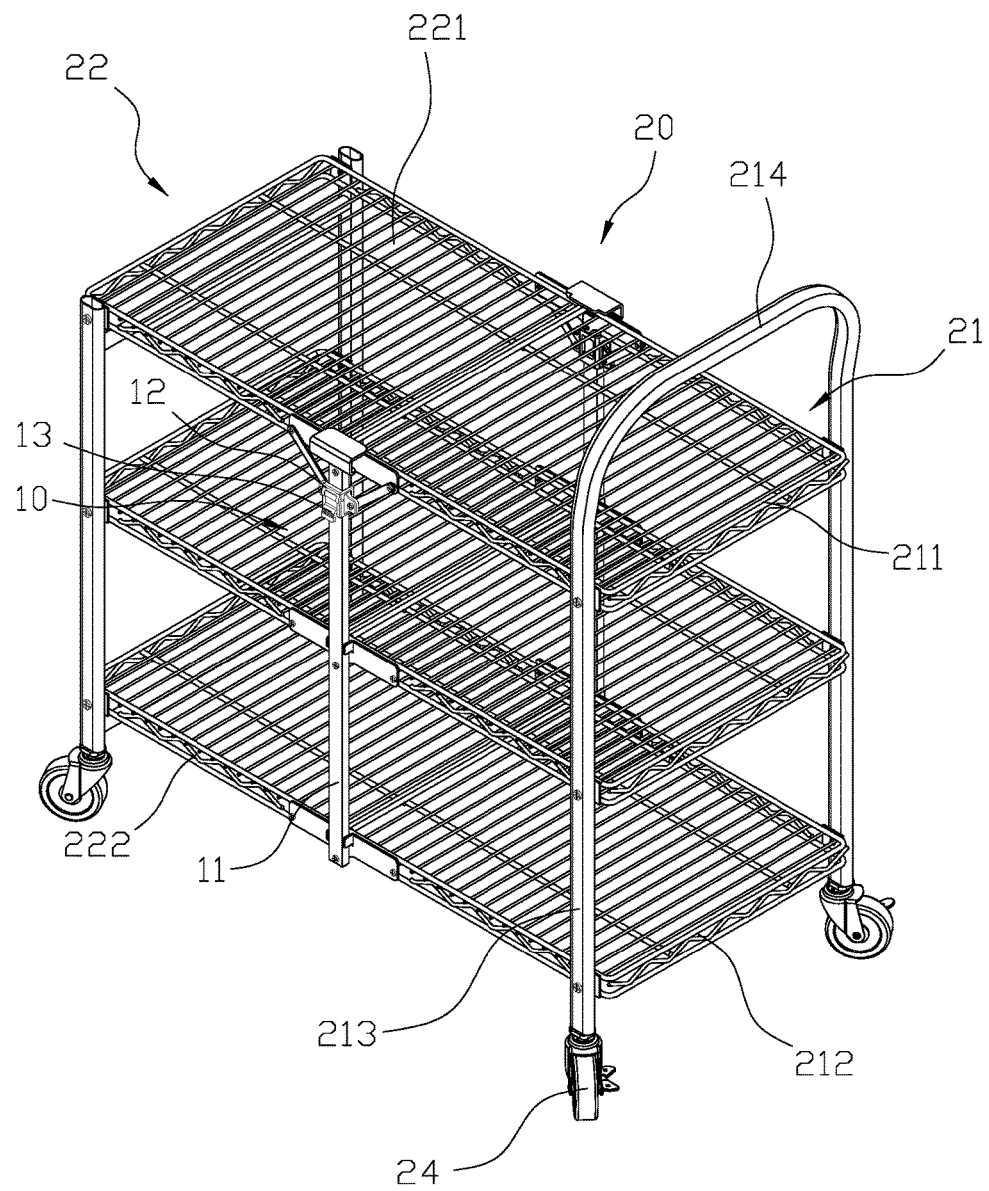
FIG. 6 is a three-dimensional assembly view of another embodiment of the portable and foldable shelving of the present invention.
Figure 7:
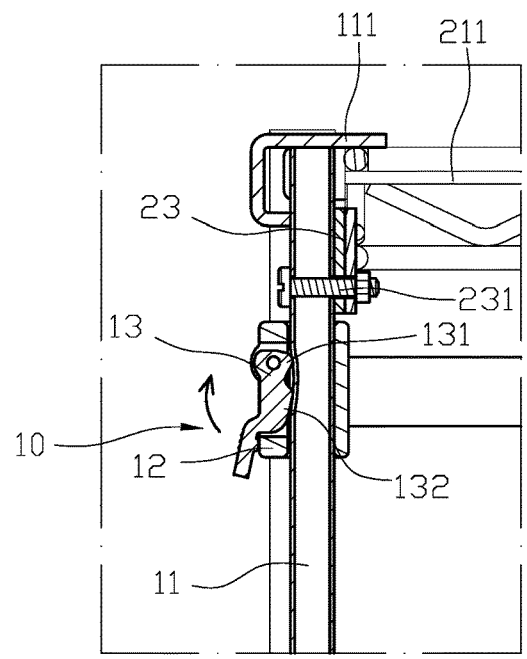
FIG. 7 is a schematic view illustrating an adjusting base of the portable and foldable shelving is secured in the present invention.
Figure 8:
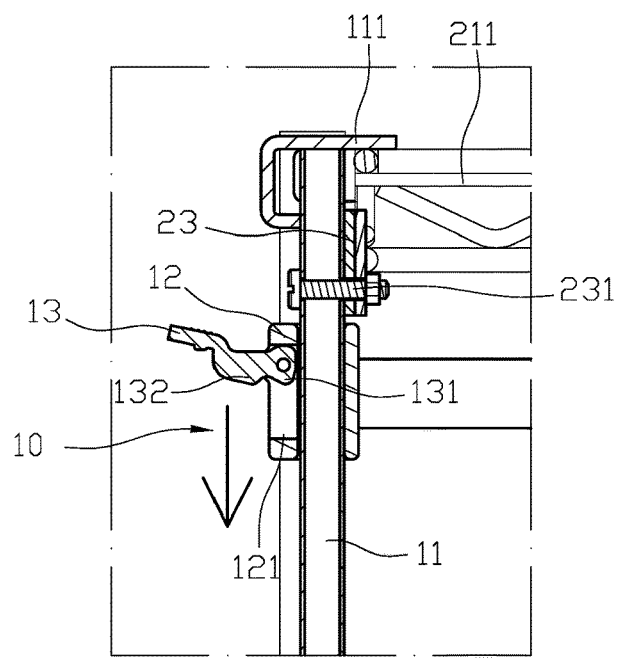
FIG. 8 is a schematic view illustrating the adjusting base of the portable and foldable shelving is loosen in the present invention.
Figure 9:
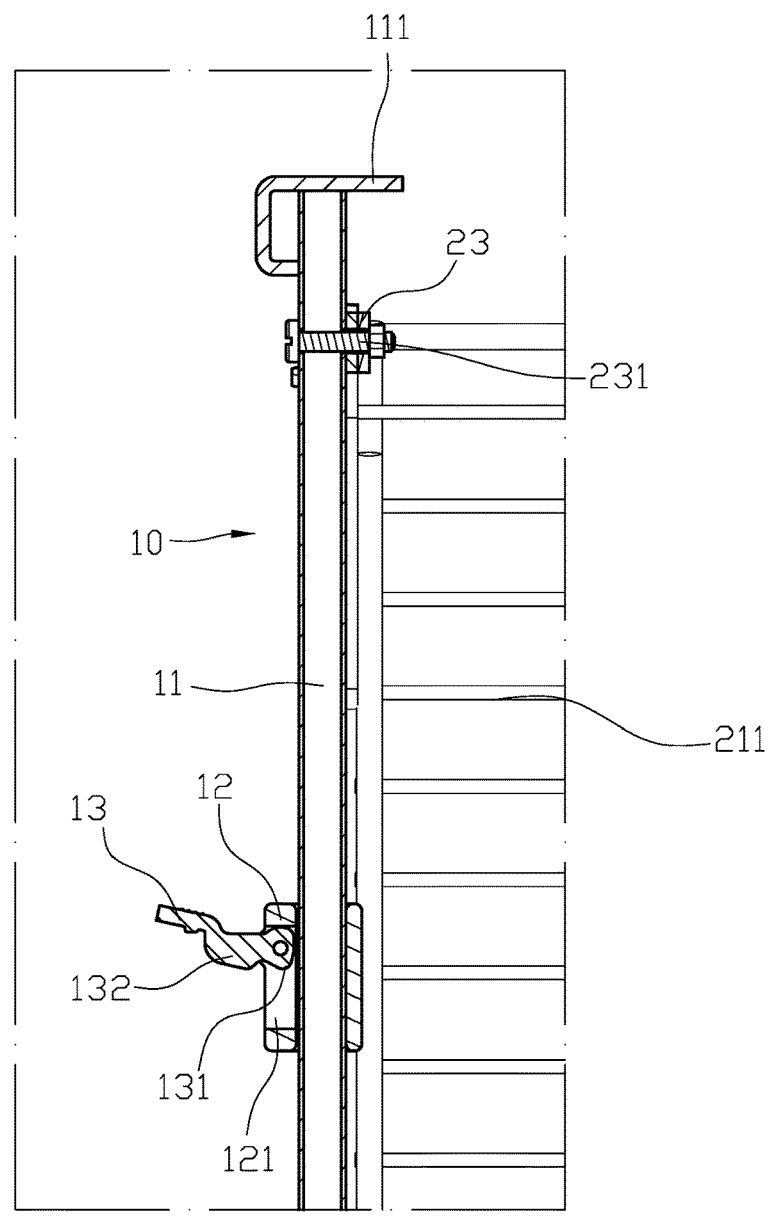
FIG. 9 is a schematic view illustrating the adjusting base of the portable and foldable shelving is moved downwardly along a connecting tube in the present invention.
Figure 10:
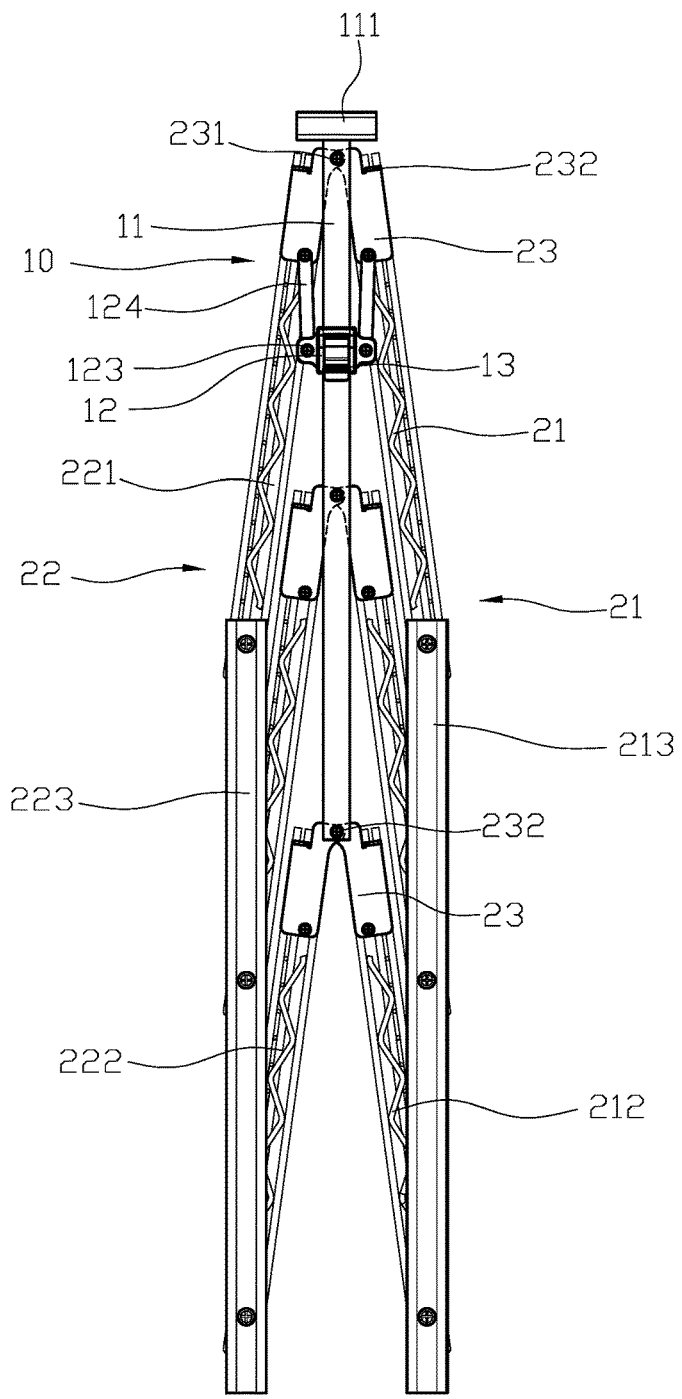
FIG. 10 is a schematic view illustrating the portable and foldable shelving of the present invention is at folded position.

In one embodiment, referring to FIG. 6, each of the first supporting posts (213) and the second supporting posts (223) is connected to a wheel (24) at a lower portion thereof to enable the shelving (20) to be portable, and a handle (214) is integrally formed between the two first supporting posts (213).

In actual application, referring to FIGS. 1, 3, 4, 5, and 7, when the shelving (20) is at unfolded position, the first upper board (211) and the second upper board (221) are positioned horizontally, and the first lower board (212) and the second lower board (222) are also positioned horizontally parallel to the first upper board (211) and the second upper board (221). In the unfolded process, for one lateral side of the shelving (20), the two side portions of each wing piece (23) is rotated about the second pivot (231), and the first upper board (211) and the second upper board (221), which are connected at the upper portion of the connecting tube (11), are configured to drive the two connecting rods (124) through the wing piece (23) so as to move the adjusting base (12) upwardly. Thereafter, the tightening member (13) of the adjusting base (12) is adapted to be moved toward the opening (121), and the first pivot (131) is configured to abut against an inner wall of the connecting tube (11), and the first abutting portion (132) is adapted to press the tightening member (13) against the connecting tube (11), thereby firmly securing the position of the adjusting base (12) and preventing the wing pieces (23) from being moved. Moreover, the wing piece (23) has the two parallel second abutting portions (232) to abut against the two lateral sides of the connecting tube (11) respectively, thereby limiting the positions of the first upper board (211), the second upper board (221), the first lower board (212) and the second lower board (222). Furthermore, the two lateral sides of the first shelf body (21) respectively have the two first supporting posts (213) while the two lateral sides of the second shelf body (22) respectively comprise the two second supporting posts (223), which are adapted to achieve supporting effect and keep the first upper board (211), the second upper board (221), the first lower board (212) and the second lower board (222) horizontal.

On the other hand, when the shelving (20) needs to be folded, referring to FIGS. 7 to 10, for one lateral side of the shelving (20), the tightening member (13) of the adjusting base (12) is loosen, and the connecting tube (11) is released from the tightening member (13), and the adjusting base (12) is adapted to move downwardly along the connecting tube (11). At this time, the first upper board (211) and the second upper board (221) are configured to be pushed downwardly, and the first shelf body (21) and the second shelf body (22) are adapted to be folded toward each other. Meanwhile, when the first upper board (211) and the second upper board (221) are pushed downwardly, the first supporting posts (213) and the second supporting posts (223) are configured to drive the first lower board (212) and the second lower board (222) to fold toward each other so as to completely fold the shelving (20). When at folded position, the shelving (20) is adapted to be positioned in a reversed-V-shaped so as to reduce volume thereof and directly stand on the floor.

Figure 11:
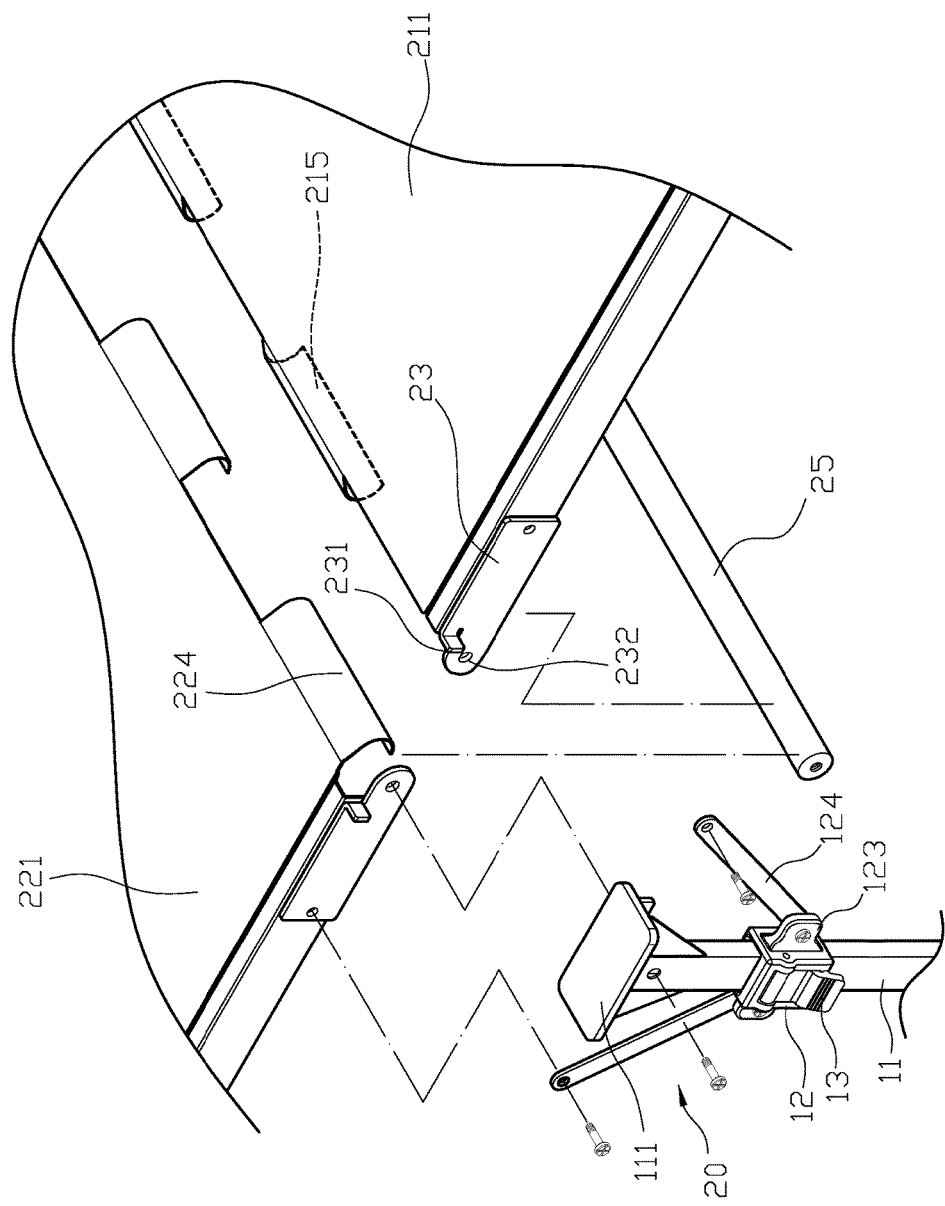
FIG. 11 is an exploded view of another embodiment of the portable and foldable shelving of the present invention.
Figure 12:
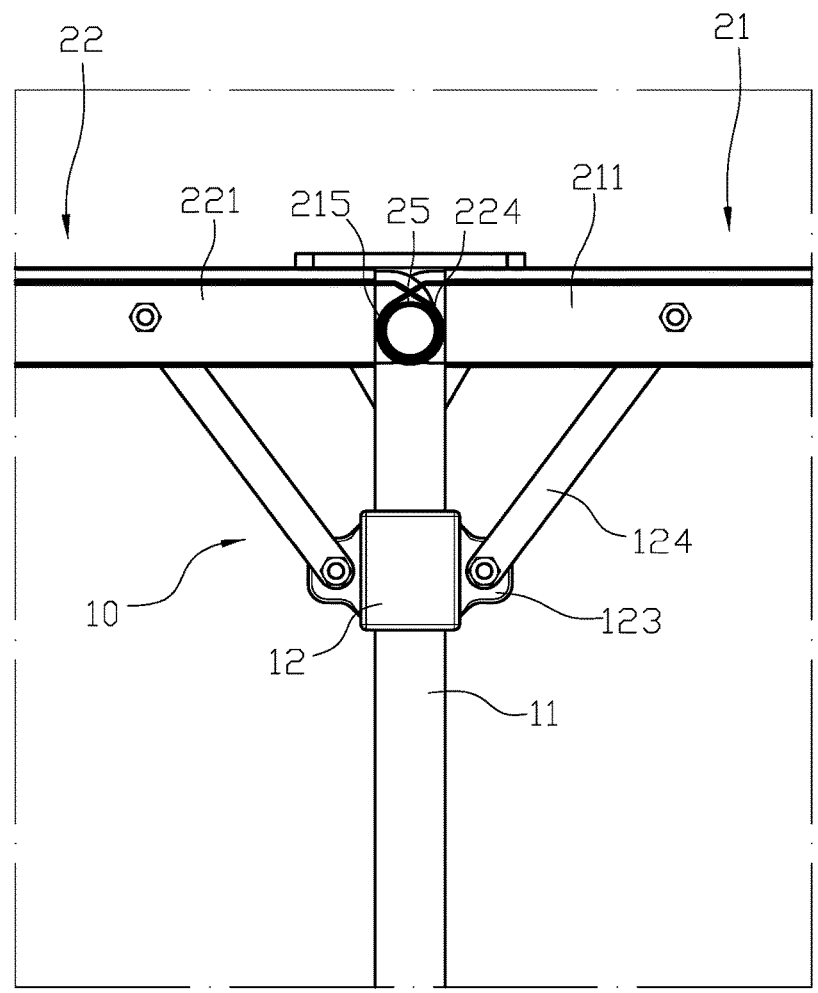
FIG. 12 is a schematic view illustrating another embodiment of the portable and foldable shelving of the present invention is at unfolded position.
Figure 13:
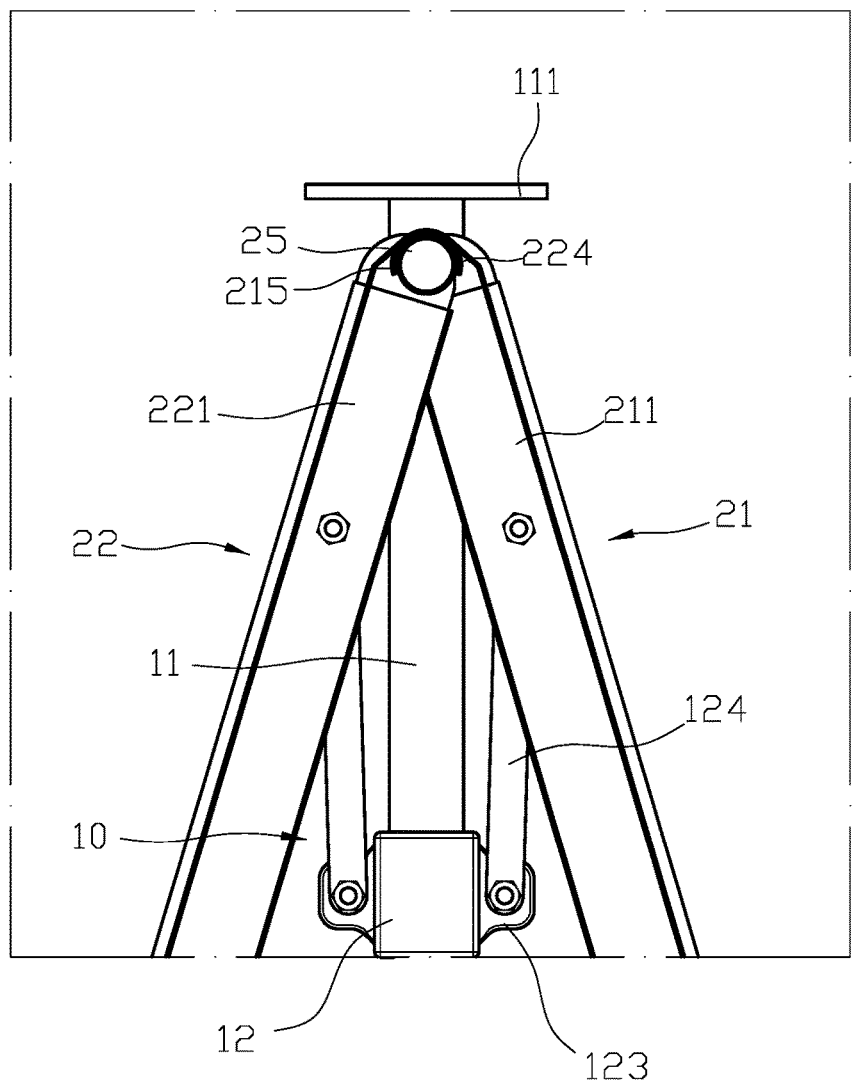
FIG. 13 is a schematic view illustrating another embodiment of the portable and foldable shelving of the present invention is at unfolded position.
Figure 14:
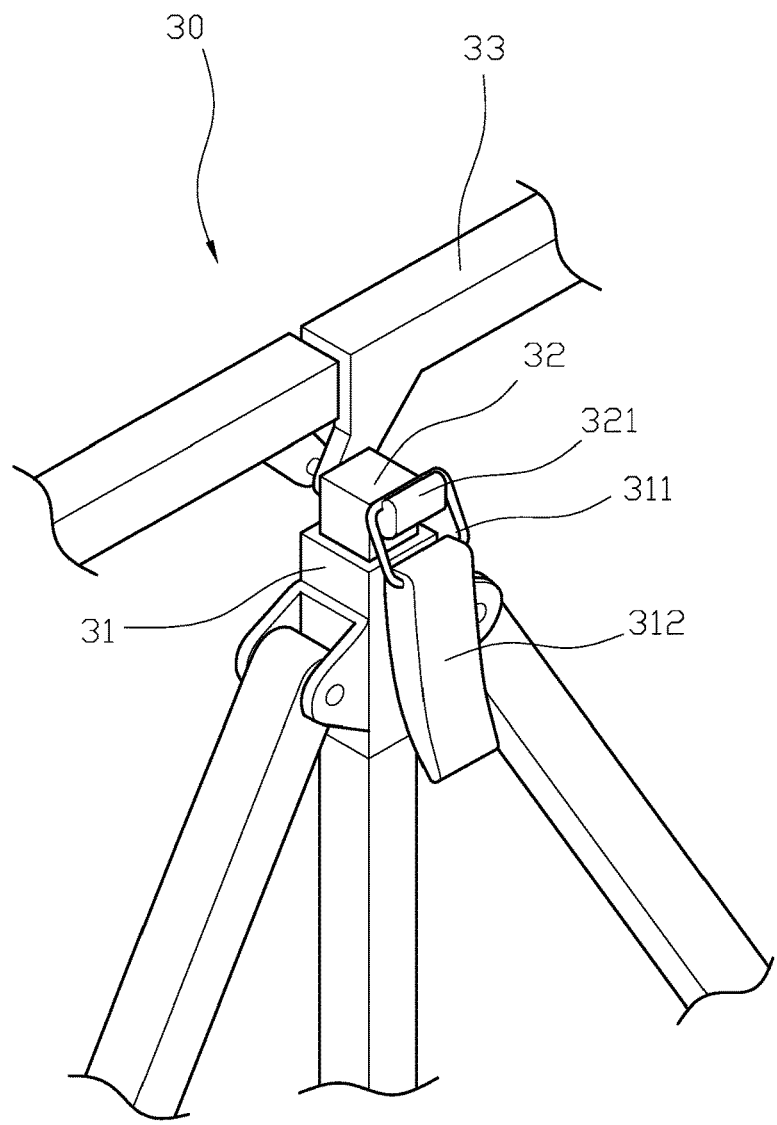
FIG. 14 is a prior art.

In another embodiment, referring to FIGS. 11 to 13, a plurality of arc-shaped first locating pieces (215) are formed at inner edges of the first upper board (211) and the first lower board (212) while a plurality of arc-shaped second locating pieces (224) are formed at inner edges of the second upper board (221) and the second lower board (222); when the first shelf body (21) is coupled with the second shelf body (22), the first locating pieces (215) on the first upper board (211) and the second locating pieces (224) on the second upper board (221) are configured to be located alternatively, and also the first locating pieces (212) on the first lower board (212) and the second locating pieces (224) on the second lower board (222) are adapted to be located alternatively; two shafts (25) are adapted to laterally penetrate through the first locating pieces (215) and the second locating pieces (224) to secure between the first upper board (211) and the second upper board (221) and to laterally penetrate through the first locating pieces (215) and the second locating pieces (224) to secure between the first lower board (212) and the second lower board (222) respectively such that the first upper board (211) and the second upper board (221) are adapted to be folded about the shaft (25) toward each other while the first lower board (212) and the second lower board (222) are configured to be folded about another shaft (25) toward each other, which improves the connecting strength between the first shelf body (21) and the second shelf body (22).

Comparing with conventional foldable shelving, the present invention is advantageous because: (i) the two connecting units (10) are respectively coupled at the two lateral sides of the shelving (20) between the first shelf body (21) and the second shelf body (22), and the upper boards (211)(221) and the lower boards (212)(222) are pivotally connected to the connecting tubes (11) through the wing pieces (23), which enables the upper boards (211)(221) same as the lower boards (212)(222) to be folded toward each other or to be unfolded away from each other; (ii) each of the adjusting bases (12) is adapted to be moved along the connecting tube (11), and the tightening member (13) is configured to secure the position of the adjusting base (12) on the connecting tube (11); and (iii) when the shelving (20) is at unfolded position, the two second abutting portions (232) of the wing piece (23) are adapted to couple with the two lateral sides of the connecting tube (11), thereby enhancing the structural strength of the shelving (20).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A portable and foldable shelving comprising two connecting units and a shelving;
  each of the two connecting units comprising: a connecting tube and an adjusting base, wherein each adjusting base is slidably sleeved on each connecting tube respectively; an opening is formed in an outer side of each adjusting base, a tightening member is pivotally connected to each adjusting base within each opening respectively through a shaft bolt, and each tightening member is configured to rotate about each shaft bolt respectively; a first pivot and a first abutting portion are formed on an inner wall of each tightening member, wherein each tightening member is adapted to secure a position of each adjusting base on each connecting tube respectively; each adjusting base has two connecting pieces respectively formed on two lateral sides of each adjusting base, wherein a connecting rod is pivotally connected to each of the connecting pieces respectively; the shelving comprising a first shelf body and a second shelf body, the first shelf body having a first upper shelf and a first lower shelf that is underneath the first upper shelf; the second shelf body comprising a second upper shelf and a second lower shelf that is underneath the second upper shelf; wherein the first upper shelf and the second upper shelf are parallel to each other, and the first lower shelf and the second lower shelf are parallel to each other; wherein each shelf has two lateral sides; wherein a first vertical supporting post and a second vertical supporting post are connected to the lateral sides of the first upper shelf and the lateral sides of the first lower shelf respectively at different heights; wherein a third vertical supporting post and a fourth vertical support post are connected to the lateral sides of the second upper shelf and the lateral sides of the second lower shelf respectively at different heights; inner edges of the first shelf body and the second shelf body are coupled together; each of the lateral sides of the first upper shelf, the first lower shelf, the second upper shelf, and the second lower shelf having a wing plate mounted thereto respectively; each of the wing plates comprising a distal through hole, a proximal through hole, and a second abutting portion defining a flange;

wherein a proximal end of a first wing plate from said wing plates on the first upper shelf overlaps a proximal end of a second wing plate from said wing plates on the second upper shelf and the proximal hole of the first wing plate aligns with the proximal hole of the second wing plate; wherein a first connecting tube from said connecting tubes has a first tube hole and a second tube hole, wherein a first fastener extends through the first tube hole and the proximal holes of the first wing plate and the second wing plate to pivotally connect the first connecting tube to the first upper shelf and the second upper shelf;

wherein a second fastener extends through the second tube hole, the proximal hole of a third wing plate from said wing plates on the first lower shelf and the proximal hole of a fourth wing plate from said wing plates on the second lower shelf to pivotally connect the first connecting tube to the first lower shelf and the second lower shelf;

wherein a first connecting rod from said connecting rods is pivotally mounted to the first wing plate by inserting a third fastener through the first connecting rod and the distal through hole of the first wing plate; wherein a second connecting rod from said connecting rods is pivotally mounted to the second wing plate by inserting a fourth fastener through the second connecting rod and the distal through hole of the second wing plate; wherein the first connecting rod and the second connecting rod connect the first wing plate and the second wing plate to a first adjusting base from said adjusting bases respectively, wherein the first adjusting base is below the first wing plate and the second wing plate;

wherein the first shelf body and the second shelf body are configured to pivot simultaneously between an expanded position and a folded position.

2. The portable and foldable shelving of claim 1, wherein each connecting tube has an inverted L-shaped upper blocking member formed at an upper end thereof respectively.

3. The portable and foldable shelving of claim 1, wherein the first vertical supporting post, the second vertical supporting post, the third vertical supporting post, and the fourth vertical supporting post each have a wheel at a lower portion thereof respectively to enable the shelving to be moved.

4. The portable and foldable shelving of claim 1, wherein a handle is integrally formed between the first vertical supporting post and the second vertical supporting post.

\* \* \* \* \*